United States Patent
Rodgers et al.

(10) Patent No.: US 8,472,311 B2
(45) Date of Patent: Jun. 25, 2013

(54) SYSTEMS, METHODS, AND COMPUTER READABLE MEDIA FOR PROVIDING INSTANTANEOUS FAILOVER OF PACKET PROCESSING ELEMENTS IN A NETWORK

(75) Inventors: Richard Rodgers, Charlestown, MA (US); James H. Cervantes, Lexington, MA (US)

(73) Assignee: Genband US LLC, Frisco, TX (US)

( * ) Notice: Subject to any disclaimer, the term of this patent is extended or adjusted under 35 U.S.C. 154(b) by 562 days.

(21) Appl. No.: 12/700,444

(22) Filed: Feb. 4, 2010

(65) Prior Publication Data

US 2011/0191624 A1    Aug. 4, 2011

(51) Int. Cl.
*H04L 12/26*    (2006.01)
*G06F 11/16*    (2006.01)

(52) U.S. Cl.
USPC .......................... 370/217; 370/225; 714/4.11

(58) Field of Classification Search
None
See application file for complete search history.

(56) References Cited

U.S. PATENT DOCUMENTS

| | | | |
|---|---|---|---|
| 5,818,842 A | 10/1998 | Burwell et al. | |
| 5,938,732 A | 8/1999 | Lim et al. | |
| 5,986,662 A | 11/1999 | Argiro et al. | |
| 6,052,733 A | 4/2000 | Mahalingam et al. | |
| 6,061,348 A | 5/2000 | Castrigno et al. | |
| 6,111,880 A | 8/2000 | Rusu et al. | |
| 6,229,538 B1 | 5/2001 | McIntyre et al. | |
| 6,272,113 B1 | 8/2001 | McIntyre et al. | |
| 6,308,282 B1 | 10/2001 | Huang et al. | |
| 6,363,497 B1 | 3/2002 | Chrabaszca | |
| 6,381,218 B1 | 4/2002 | McIntyre et al. | |
| 6,512,774 B1 | 1/2003 | Vepa et al. | |
| 6,633,563 B1 | 10/2003 | Lin et al. | |
| 6,697,872 B1 * | 2/2004 | Moberg et al. | 709/238 |
| 6,714,535 B1 | 3/2004 | Herh | |
| 6,728,780 B1 | 4/2004 | Hebert | |
| 6,738,826 B1 | 5/2004 | Moberg et al. | |
| 6,741,585 B1 | 5/2004 | Munoz et al. | |

(Continued)

FOREIGN PATENT DOCUMENTS

| | | |
|---|---|---|
| EP | 1 668 471 A2 | 4/2005 |
| WO | WO 2005/033889 A2 | 4/2005 |
| WO | WO 2006/128005 A2 | 11/2006 |

OTHER PUBLICATIONS

Interview Summary for U.S. Appl. No. 11/240,317 (Jun. 22, 2010).

(Continued)

*Primary Examiner* — Min Jung
(74) *Attorney, Agent, or Firm* — Fogarty, L.L.C.

(57) ABSTRACT

Systems, methods, and computer program products for providing instantaneous failover of packet processing elements in a network are disclosed. According to one aspect, the subject matter described herein includes a system for providing instantaneous failover of packet processing elements in a network. The system includes a plurality of packet processing elements for processing packets in a network and a packet distribution module for maintaining information about the operating status of each element of the plurality of packet processing elements, for maintaining information about packet flows being processed by the packet processing elements, and, for each packet flow, assigning one of the plurality of packet processing elements as the primary element for the packet flow and assigning another of the plurality of packet processing elements as the secondary element for the packet flow. The packet distribution module routing packets to the packet processing elements according to the operating status of the packet processing elements that have been assigned to the packet flow with which the packets are associated.

30 Claims, 3 Drawing Sheets

U.S. PATENT DOCUMENTS

| | | | |
|---|---|---|---|
| 6,754,745 B1 | 6/2004 | Horvath et al. | |
| 6,763,479 B1 | 7/2004 | Hebert | |
| 6,766,482 B1 | 7/2004 | Yip et al. | |
| 6,771,673 B1 | 8/2004 | Baum et al. | |
| 6,778,491 B1 | 8/2004 | Fourcand et al. | |
| 6,850,531 B1 | 2/2005 | Rao et al. | |
| 6,856,591 B1 | 2/2005 | Ma et al. | |
| 6,862,564 B1 | 3/2005 | Shue et al. | |
| 6,879,667 B1 | 4/2005 | Carew et al. | |
| 6,891,836 B1 | 5/2005 | Chen et al. | |
| 6,895,528 B2 | 5/2005 | Cantwell et al. | |
| 6,910,148 B1 | 6/2005 | Ho et al. | |
| 6,928,482 B1 | 8/2005 | Ben Nun et al. | |
| 6,938,092 B2 | 8/2005 | Burns | |
| 6,975,587 B1 | 12/2005 | Adamski et al. | |
| 7,177,943 B1 | 2/2007 | Temoshenko et al. | |
| 7,185,094 B2 | 2/2007 | Marquette et al. | |
| 7,212,519 B2 | 5/2007 | Johnson et al. | |
| 7,233,567 B1 | 6/2007 | Li | |
| 7,239,605 B2 | 7/2007 | Dinker et al. | |
| 7,263,060 B1 | 8/2007 | Garofalo et al. | |
| 7,280,557 B1* | 10/2007 | Biswas et al. | 370/465 |
| 7,289,487 B2 | 10/2007 | Jang | |
| 7,293,080 B1 | 11/2007 | Clemm et al. | |
| 7,424,025 B2 | 9/2008 | Qian et al. | |
| 2002/0012352 A1 | 1/2002 | Hansson et al. | |
| 2002/0016926 A1 | 2/2002 | Nguyen et al. | |
| 2002/0051464 A1 | 5/2002 | Sin et al. | |
| 2002/0191612 A1 | 12/2002 | Curtis | |
| 2003/0118039 A1 | 6/2003 | Nishi et al. | |
| 2003/0142795 A1 | 7/2003 | Gavette et al. | |
| 2003/0172319 A1 | 9/2003 | Ryhorchuk et al. | |
| 2003/0174729 A1 | 9/2003 | Heink et al. | |
| 2004/0008722 A1 | 1/2004 | Ellis et al. | |
| 2004/0030757 A1 | 2/2004 | Pandya | |
| 2004/0066782 A1 | 4/2004 | Nassar | |
| 2004/0071142 A1 | 4/2004 | Moriwaki et al. | |
| 2004/0131064 A1 | 7/2004 | Burwell et al. | |
| 2005/0053073 A1 | 3/2005 | Kloth et al. | |
| 2005/0185577 A1 | 8/2005 | Sakamoto et al. | |
| 2005/0243716 A1 | 11/2005 | Bitar et al. | |
| 2005/0281190 A1 | 12/2005 | McGee et al. | |
| 2006/0002292 A1* | 1/2006 | Chang et al. | 370/225 |
| 2006/0013240 A1* | 1/2006 | Ma et al. | 370/401 |
| 2006/0023718 A1* | 2/2006 | Joly | 370/392 |
| 2006/0143309 A1 | 6/2006 | McGee et al. | |
| 2006/0176804 A1* | 8/2006 | Shibata | 370/217 |
| 2006/0268686 A1 | 11/2006 | Shei et al. | |
| 2007/0076727 A1 | 4/2007 | Shei | |
| 2007/0083528 A1 | 4/2007 | Matthews et al. | |
| 2007/0183314 A1 | 8/2007 | Li et al. | |
| 2008/0317055 A1 | 12/2008 | Zetterlund et al. | |
| 2009/0092044 A1 | 4/2009 | Saito | |
| 2010/0088756 A1* | 4/2010 | Balakrishnan et al. | 726/13 |
| 2010/0242093 A1* | 9/2010 | Zuk et al. | 726/3 |
| 2010/0325474 A1* | 12/2010 | Gopinath et al. | 714/4 |

OTHER PUBLICATIONS

Final Official Action for U.S. Appl. No. 11/240,317 (Jun. 14, 2010).
Final Official Action for U.S. Appl. No. 11/139,019 (Apr. 27, 2010).
Official Action for U.S. Appl. No. 11/702,009 (Jan. 13, 2010).
Official Action for U.S. Appl. No. 11/240,317 (Dec. 16, 2009).
Non-Final Official Action for U.S. Appl. No. 11/139,019 (Oct. 28, 2009).
Advisory Action for U.S. Appl. No. 11/240,317 (Oct. 8, 2009).
Final Official Action for U.S. Appl. No. 11/240,317 (Jun. 23, 2009).
Official Action for U.S. Appl. No. 11/702,009 (Apr. 17, 2009).
Final Official Action for U.S. Appl. No. 11/139,019 (Mar. 23, 2009).
Interview Summary for U.S. Appl. No. 11/139,019 (Jan. 27, 2009).
Official Action for U.S. Appl. No. 11/240,317 (Jan. 26, 2009).
Communication pursuant to Rules 161 and 162 EPC for European Patent Application No. 04789383.9 (Sep. 24, 2008).
Official Action for U.S. Appl. No. 11/139,019 (Sep. 17, 2008).
Official Action for U.S. Appl. No. 11/240,317 (Jun. 23, 2008).
Notification of Transmittal of the International Search Report and the Written Opinion of the International Searching Authority, or the Declaration for International Application No. PCT/US06/20456 (Oct. 20, 2006).
Communication pursuant to Rules 109 and 110 EPC for European Application No. 04789383.9 (Aug. 22, 2006).
Martini et al. "Encapsulation Methods for Transport of ATM Over MPSL Networks," Network Working Group, Internet Draft, (Apr. 2005).
"FHRP—VRRP Enhancements," Cisco IOS Release 12.3(14)T, Cisco Systems, pp. 1-28 (Copyright 2005).
Hinden, "RFC 3768—Vitural Router Redundancy Protocol (VRRP)," Internet RFC/STD/FYI/BCP Archives, 20 pages (Apr. 2004).
Yoo et al., "A Media Stream Processing of VoIP Media Gateway," IEEE, pp. 91-94 (2003).
Stern et al. "Survivability: Protection and Restoration," Multiwavelength Optical Networks, p. 610-613 (May 1999).
Notice of Allowance and Fee(s) Due for U.S. Appl. No. 11/240,317 (Oct. 1, 2010).
Notice of Allowance and Fee(s) Due for U.S. Appl. No. 11/702,009 (Sep. 20, 2010).
Interview Summary for U.S. Appl. No. 11/139,019 (Aug. 31, 2010).
Interview Summary for U.S. Appl. No. 11/240,317 (Aug. 27, 2010).

* cited by examiner

SYSTEMS, METHODS, AND COMPUTER READABLE MEDIA FOR PROVIDING INSTANTANEOUS FAILOVER OF PACKET PROCESSING ELEMENTS IN A NETWORK

TECHNICAL FIELD

The subject matter described herein relates to methods and systems for providing failover of network elements. More particularly, the subject matter described herein relates to systems, methods, and computer readable media for providing instantaneous failover of packet processing elements in a network.

BACKGROUND

In a packet processing system comprised of a cluster of identical packet processing elements with 1-to-many (1:N) redundancy, the load must be distributed across the elements by an entity separate from the cluster of packet processing elements. Because this entity is conceptually located hierarchically "above" the cluster, the entity is often referred to as a load balancing tier or level. When one of the cluster elements fails, the load formerly handled by the failed elements must be redirected to one or more backup elements. This process or feature is herein referred to as "failover capability". During the interval between the failure of one cluster element and the redirection of load to one or more backup elements, referred to herein as the "failover response period," packets formerly processed by the failed cluster element may be lost or dropped. Thus, in order to reduce or eliminate lost or dropped packets, it is desirable to reduce or eliminate the failover response period.

One approach used by conventional implementations of element clusters is to rely on an external layer 2 switch to effect failover, by directing all traffic to one or the other of two separate chassis, i.e., the primary chassis and the secondary chassis, each of which may contain multiple processing cards operating as a cluster of elements. Under normal operation, the layer 2 switch directs all traffic to the primary chassis. Upon detection of a failure of the primary chassis, the layer 2 switch will then direct all traffic to the secondary chassis.

However, this conventional failover process is relatively time consuming. For example, the failure of the primary chassis must either be detected by the secondary or by another entity that must then notify the secondary of the primary's failure. In one conventional implementation, the primary and secondary chassis are organized in a high-availability configuration in which both the primary and secondary chassis share a common Internet protocol (IP) address, but where only one of the two chassis will respond to messages directed to that address. In this configuration, the layer 2 switch may broadcast regular address resolution protocol (ARP) messages that include the shared IP address, which are received by both the primary and the secondary chassis. In normal operation, only the primary chassis will respond to the ARP message, identifying itself to the layer 2 switch as the entity that responds to the shared IP address. Once the secondary chassis detects or is informed that the primary has failed, the secondary chassis then issues a gratuitous ARP message to the layer 2 switch, to identify itself as the entity now responding to the shared IP address. In response to receiving the gratuitous ARP from the secondary chassis, the layer 2 switch will update its routing table. The process of receiving the gratuitous ARP from the secondary and updating the layer 2 switch routing tables can take multiple seconds, during which time hundreds or thousands of packets may be lost. For example, a 100 Mbit/s Ethernet connection running at 50% utilization could transport approximately 4,200 1500-byte Ethernet packets per second; a 3 second failover response time could cause approximately 12,600 IP packets to be lost or dropped.

The steps performed by conventional systems and described above occur during the failover process. Thus, it can be said that these steps define or determine the failover response interval. The disadvantage of the conventional systems described above is that these steps are time consuming. The longer this process, the longer the failover response interval, and the more likely that packets will be lost or dropped.

Thus, in order to reduce or eliminate lost or dropped packets, it is desirable to reduce or eliminate the failover response period. Accordingly, there exists a need for instantaneous failover of packet processing elements in a network.

SUMMARY

According to one aspect, the subject matter described herein includes a system for providing instantaneous failover of packet processing elements in a network. The system includes a plurality of packet processing elements for processing packets in a network and a packet distribution module for maintaining information about the operating status of each element of the plurality of packet processing elements, for maintaining information about packet flows being processed by the packet processing elements, and, for each packet flow, assigning one of the plurality of packet processing elements as the primary element for the packet flow and assigning another of the plurality of packet processing elements as the secondary element for the packet flow. The packet distribution module routing packets to the packet processing elements according to the operating status of the packet processing elements that have been assigned to the packet flow with which the packets are associated.

According to another aspect, the subject matter described herein includes a method for providing instantaneous failover of packet processing elements in a network. The method includes, at a packet distribution module for receiving and routing packets to a plurality of packet processing elements: maintaining information about the operating status of each element of the plurality of packet processing elements; maintaining information about packet flows being processed by the plurality of packet processing elements, and, for each packet flow, assigning one of the plurality of packet processing elements as the primary element for the packet flow and assigning another of the plurality of packet processing elements as the secondary element for the packet flow; and routing packets to the packet processing elements according to the operating status of the packet processing elements that have been assigned to the packet flow with which the packets are associated.

The subject matter described herein for providing instantaneous failover of packet processing elements in a network may be implemented in hardware, software, firmware, or any combination thereof. As such, the terms "function" or "module" as used herein refer to hardware for implementing the feature being described, and may also include a software and/or firmware component. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for instantaneous failover of packet processing elements in a network. In order to reduce or eliminate the failover response time, the packet forwarding function is tightly integrated with element status monitoring/failure detection. In addition, the element status may be represented by data structure, such as a bitmap, that quickly and unambiguously indicates the status of elements in the cluster.

Figure 1:
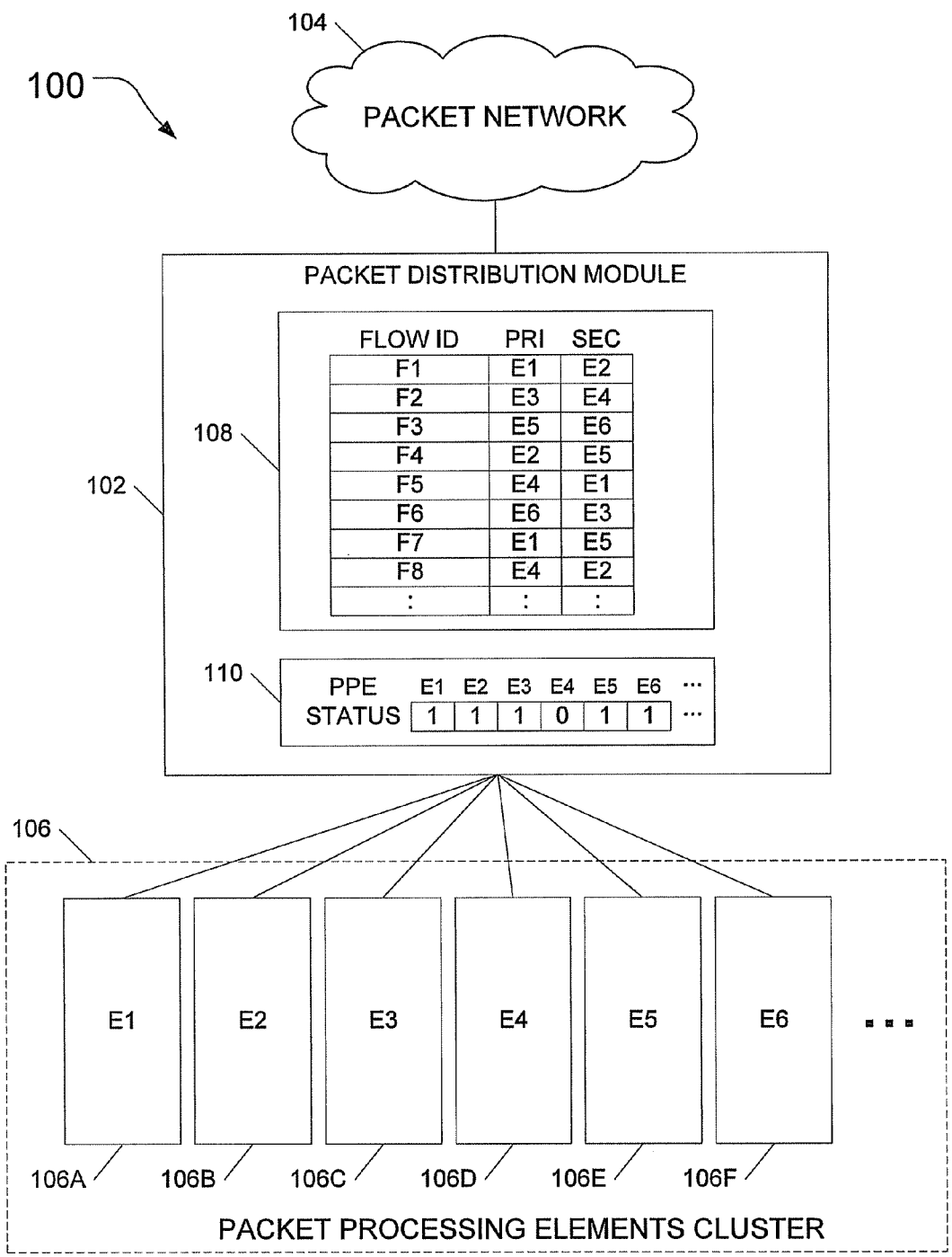
FIG. 1 is a block diagram illustrating an exemplary system for providing instantaneous failover of packet processing elements in a network according to an embodiment of the subject matter described herein.

FIG. 1 is a block diagram illustrating an exemplary system for providing instantaneous failover of packet processing elements in a network according to an embodiment of the subject matter described herein. System 100 includes a packet distribution module 102 for receiving packets from a packet network 104 and distributing them among multiple identical packet processing elements in a cluster 106. In the embodiment illustrated in FIG. 1, cluster 106 includes packet processing elements (PPE) 106A~F, but other numbers of PPEs is contemplated by the subject matter described herein. The elements of cluster 106 may be organized in a 1-to-N ("1:N") redundancy configuration, a high-availability configuration, or other configuration that provides for failover capability.

Packet processing elements 106A~F may each be any suitable computing platform that processes flows of packets. Examples of packet processing elements include media gateways, session border controllers, and security gateways. Packet processing elements 106A~F may be co-located with each other and/or with packet distribution module 102. For example, packet processing elements 106 and packet distribution module 102 may be cards in a telecommunications frame, modules in a rack, etc., Alternatively, packet processing elements 106 may be distributed from each other and/or from packet distribution module 102. For example, some or all of packet processing elements 106A~F may be located in geographically separate locations from each other, a configuration which is commonly referred to as "geodiverse". Similarly, packet processing elements 106 may be geodiverse from packet distribution module 102. Other geodiverse configurations are also contemplated.

In the embodiment illustrated in FIG. 1, packet distribution module 102 classifies packet traffic into flows. As used herein, the term "packet flow", sometimes called "flow" for brevity, refers to a collection of packets that have a shared characteristic or have a predefined association with or relationship to each other.

In one embodiment, a flow may refer to packets that are part of a communication between two specific endpoints. For example, a flow may refer to a call in the network, such as a voice over Internet protocol (VoIP) call, a session in the network, or a media stream in the network. In this case, a flow may be uniquely identified by the source and destination fields in the packet headers. A flow may also refer to a call attempt, meaning that the flow may include packets transmitted between entities as part of a call setup procedure, whether or not that procedure results in the successful establishment of a call.

In one embodiment, a flow may refer to packets that are part of a communication between two specific applications, such as a session between a client and server, or a media stream sent to a user's browser on a computer or mobile device. In these examples, a flow may be uniquely identified by the source and destination fields of the packets along with additional information that identifies the particular application(s) that are communicating with each other. For example, a user of a computer or similar device may be simultaneously browsing the web, streaming music, and checking his or her email. In this example, there may be three distinct flows: a first flow for the http stream to the user's browser, a second flow for the media stream of the music, and a third flow for the commands and data being transmitted between the mail server and the user's local mail client. In these examples, in order to distinguish the three flows, packet distribution module 102 may have to consider other packet header fields, such as source or destination TCP port number in addition to source or destination IP address, or even packet data that is not part of the packet header, such as a media type indicator.

In one embodiment, a flow may represent a type, class, or category of traffic. For example, signaling channel messages may be classified as one flow while data bearer channel messages may be classified as another flow. In one embodiment, the packets belonging to one flow are transmitted using a stateful protocol and are therefore processed by the same packet processing element, so that only the selected packet processing element need maintain the state information for that flow. The example embodiments of a flow are for illustrative purposes only and are not intended to be limiting.

In the embodiment illustrated in FIG. 1, packet distribution module 102 maintains information associated with each flow. In one embodiment, packet distribution module 102 creates and maintains flow objects, which store information about a flow, such as a packet flow identifier for identifying the packet flow, information identifying the primary packet processing element that is assigned to the packet flow, and information identifying the secondary or backup processing element that is assigned to the packet flow. In one embodiment, additional backup processing elements may be assigned to each packet flow. Flow objects may be data structures, table entries, database records, programming objects, or other means for storing information associated with a flow.

In one embodiment, packet distribution module 102 may create flow objects based on information stored within packets. For example, packet distribution module 102 may create a flow object for a particular packet based on a hash of values contained within the packet header of the particular packet. In one embodiment, a flow object identifier, or flow object ID, may be created from the hash of values within the packet. The values used to create the hash may come from the packet header, the packet payload, or any other portion of the packet. In one embodiment, a packet flow identifier may incorporate a source identifier and a destination identifier. Example source or destination identifiers include telephone numbers or directory numbers associated with the calling or called parties, network addresses, subscriber identifiers, URLs or URIs, or any kind of information that may be used to identify a source or destination of the packet flow. Alternatively, a flow object identifier may indicate a subscriber associated with a packet flow, such as a calling party or a called party, or a party to be billed for the packet flow, where the party to be billed may or may not be a party to the call.

In one embodiment, the values used to create the hash may come from information not contained within the packet but nevertheless associated with the packet, such as the network interface upon which the packet was received, the date or time that the packet was received, the geographical location at which the packet was received, information identifying the particular packet distribution module 102 which received the packet, and so on.

In the embodiment illustrated in FIG. 1, packet distribution module 102 maintains a flow object table 108 for storing information for each flow, including the flow identifier, the primary packet processing element that has been assigned to the packet flow, and the secondary packet processing element 106 that has been assigned to the packet flow. In FIG. 1, flow object table 108 contains information for several flows. Each flow is identified with a unique identifier, shown in FIG. 1 as F1, F2, and so on. For brevity, reference to the flow object that represents a flow is considered synonymous with a reference to the packet flow itself. In FIG. 1, for example, the phrase "E1 is the primary for F1" means both that the packet flow identified by the name "F1" is assigned to packet element E1 and that the flow object assigned to flow F1 has the value "E1" in the field used for storing the identify of the primary packet processing element.

In the embodiment illustrated in FIG. 1, referring to the first data row of flow object table 108, it can be seen that flow F1 has packet processing element #1 (E1 106A) as its primary packet processing element and packet processing element #2 (E2 106B) as its secondary or backup packet processing element. Thus, if packet distribution module 102 receives an incoming packet that is part of flow F1, packet distribution module 102 will forward the packet to E1 106A if E1 106A is operational to process packets and to E2 106B if E1 106A is not operational to process packets. A packet processing element may be non-operational to process packets if, for example, the processing element has completely or partially failed, if the processing element is too congested, if the processing element has been taken offline for maintenance, or for other reasons.

In the embodiment illustrated in FIG. 1, a packet processing element status map 110 is used to maintain information about the operational status of each of the packet processing elements. In one embodiment, status map 110 may include a bitmap with one bit for each packet processing element 106 in system 100, where the value of each bit in the bitmap indicates the operational status of the packet processing element 106 represented by the bit. For example, a bit value of "1" may be used to indicate that the packet processing element 106 is operational to process packets, while a bit value of "0" may be used to indicate that the packet processing element 106 is not operational to process packets. In alternative embodiments, status map 110 may use multiple bits for each packet processing element, or other types of data fields, such as numbers, strings, data structures, etc., to represent the operational status of each of the packet processing elements 106. In the example illustrated in FIG. 1, status map 110 indicates that packet processing element #4 (i.e., E4 106D) is not operational to process packets.

In one embodiment, status map 110 may be maintained by packet distribution module 102, and may be a component of or co-located with packet distribution module 102. In alternate embodiments, status map 110 may be located separate from packet distribution module 102, or maintained by an entity separate from packet distribution module 102 within system 100.

In one embodiment, packet processing element status information maintained in status map 110 may be determined by the use of status messages which may be sent by a first node to a second node in order to provide an indication to a second node that the first node is still operating. Periodic status messages are referred to as heartbeat messages or "heartbeats". For example, packet processing elements 106A~F and packet distribution module 102 may exchange heartbeat messages with each other. In one embodiment, packet processing elements 106A~F send periodic heartbeats to packet distribution module 102, which maintains information about each respective packet processing element in status map 110. For example, in response to failure to receive a heartbeat message from a particular packet processing element, packet distribution module 102 may clear the corresponding bit in status map 110, to indicate that the particular processing element is not operational to process packets. Alternatively, packet distribution module 102 may periodically send messages to each packet processing element 106A~F, to which packet distribution module 102 expects a reply. If packet distribution module 102 does not receive a timely reply, or receives no reply at all, from a particular processing element 106, it can be inferred that the particular processing element is not operational to process packets, in which case the corresponding bit in status map 110 may be updated to reflect the change in status. In alternative embodiments, an entity within system 100 other than packet distribution module 102 may be responsible for updating the information in status map 110, in which case this other entity may receive or exchange heartbeats from packet processing elements 106.

Status messages may also be sent aperiodically, such as on an as-needed basis or in response to a detection that a certain time period has elapsed without traffic. For example, packet processing element 106A may issue a status message to packet distribution module 102 if it has not received any packet from packet distribution module 102 for more than some preset duration, such as 100 milliseconds. Likewise, packet distribution module 102 may issue a status message to packet processing element 106A if packet distribution module 102 has not received any communication from packet processing element 106A for more than some preset duration.

In one embodiment, the status message may be a unilateral message sent from one node to another. Alternatively, the status message may be request message to which the sender expects a reply. In one embodiment, the status message may be a simple message containing only header information identifying the source of the message. Alternatively, the status message may include additional information about the status of the sending node. For example, the status message may include status indicators, an indication of the sending node's current capacity, load, or throughput, or other information.

Figure 2:
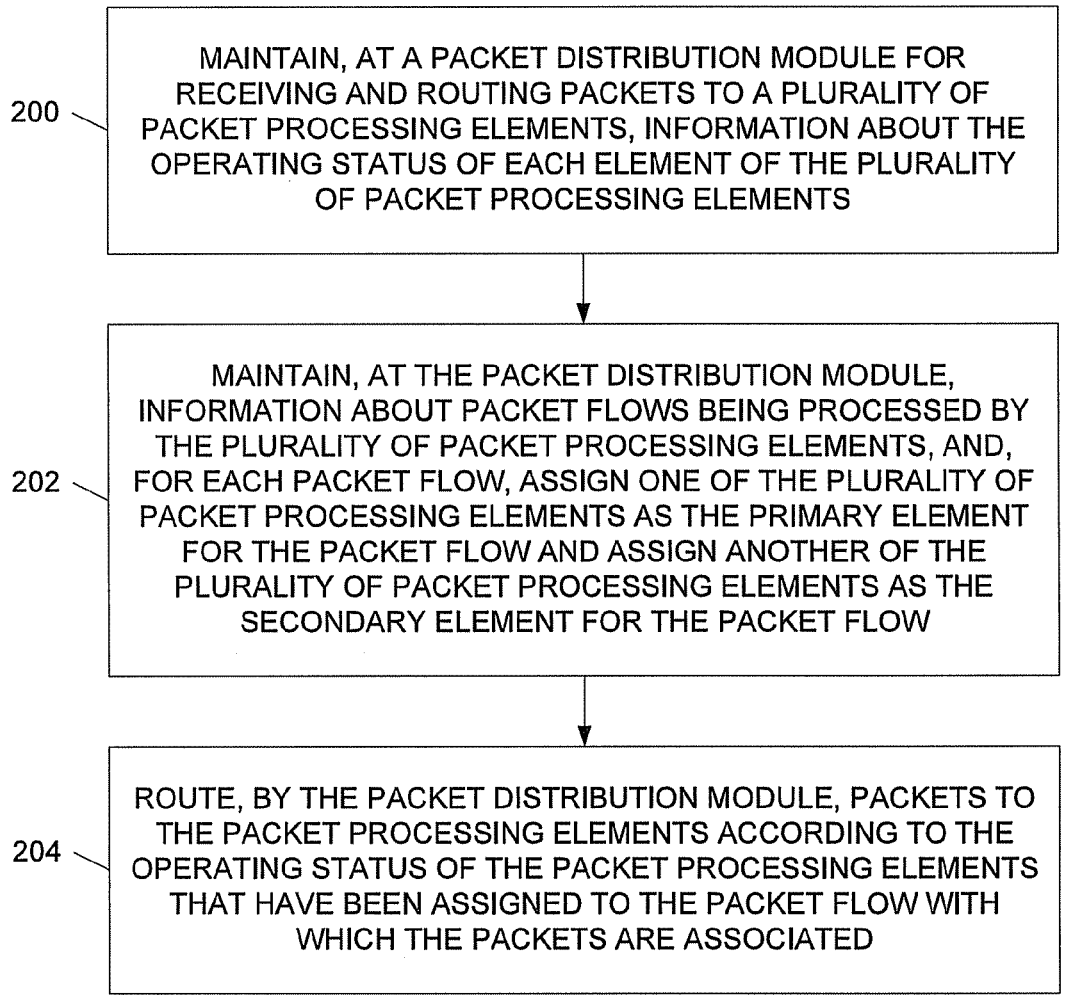
FIG. 2 is a flow chart illustrating an exemplary process for providing instantaneous failover of packet processing elements in a network according to an embodiment of the subject matter described herein.

FIG. 2 is a flow chart illustrating an exemplary process for providing instantaneous failover of packet processing elements in a network according to an embodiment of the subject matter described herein. This flow chart will be described with reference to FIGS. 1 and 2.

At block 200, information about the operating status of each element of the plurality of packet processing elements is maintained at a packet distribution module for receiving and routing packets to a plurality of packet processing elements. For example, packet distribution module 102 may maintain information about the operational status of each packet processing element 106 using bitmap 110.

At block 202, information about packet flows being processed by the plurality of packet processing elements is maintained at the packet distribution module. For each packet flow, one of the plurality of packet processing elements is assigned as the primary element for the packet flow and another of the plurality of packet processing elements is assigned as the secondary element for the packet flow. For example, packet distribution module 102 may maintain such information in flow object table 108. In one embodiment, packet distribution module 102 may identify the packet flow to which the packet is associated by looking at an intrinsic characteristic of the packet, an extrinsic characteristic of the packet, some combination of the two, or some other information. Intrinsic characteristics of the packet may include values within the packet itself, such as source and destination address fields. Extrinsic characteristics may include characteristics that are independent of the packet contents, such as the network interface by which the packet arrived, date or time that the packet arrived, current traffic conditions of the network, and so on.

At block 204, the packet distribution module routes packets to the packet processing elements according to the operating status of the packet processing elements that have been assigned to the packet flow with which the packets are associated. For example, packet distribution module 102 may receive an incoming packet, determine which packet flow the packet belongs to, and use flow object table 108 to determine which packet processing element 106 is assigned as the primary packet processing element for that flow. At that time, packet distribution module 102 may also determine which packet processing element 106 is assigned as the secondary or backup packet processing element. Packet distribution module 102 may then check status bitmap 110 to determine whether the assigned primary packet processing element is operational to process packets. If the assigned packet processing element is operational to process packets, packet distribution module 102 may then forward the incoming packet to the assigned packet processing element. If the assigned packet processing element is not operational to process packets, then packet distribution module 102 will forward the packet to the secondary packet processing element 106. If packet distribution module 102 has not already determined which packet processing element is assigned as the secondary or backup packet processing element, packet distribution module 102 may again consult flow object table 108 to determine the secondary packet processing element.

It can be seen that because the packet forwarding function of packet distribution module 102 has nearly instantaneous access to the operational status of each of the packet processing elements 106, e.g., via status bitmap 110, several time-consuming steps that are performed by conventional systems may be avoided: packet distribution module 102 does not need to wait for a secondary packet processing element to issue a gratuitous ARP message in response to detection that the primary packet processing element has failed, and packet distribution module 102 does not need to update its routing table in response to such a message. On the contrary, flow object table 108 has already been provisioned, and need not be modified.

Figure 3:
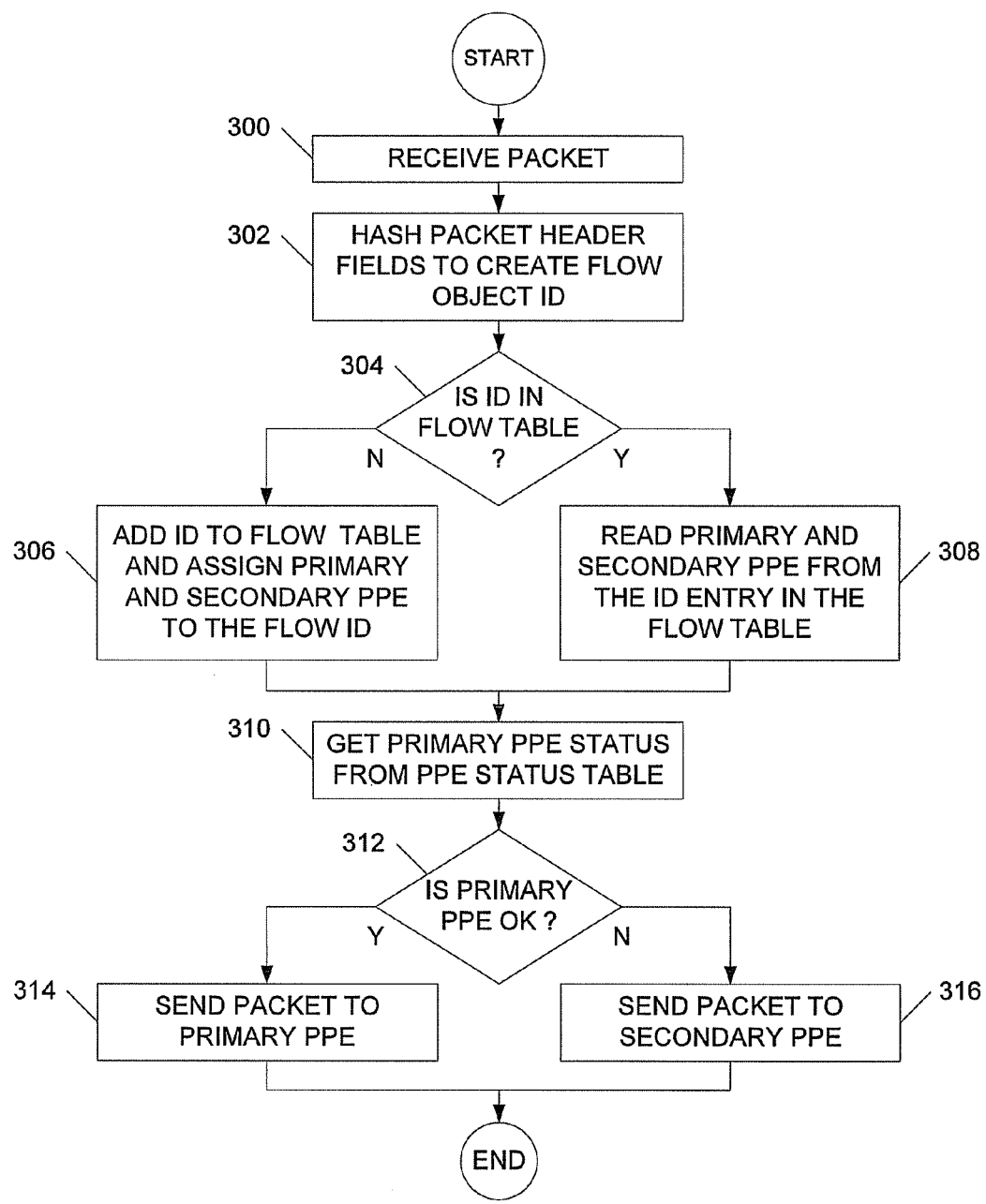
FIG. 3 is a flow chart illustrating in more detail an exemplary process for providing instantaneous failover of packet processing elements in a network according to an embodiment of the subject matter described herein.

FIG. 3 is a flow chart illustrating in more detail an exemplary process for providing instantaneous failover of packet processing elements in a network according to an embodiment of the subject matter described herein. This flow chart will be described with reference to FIGS. 1 and 3. At block 300, a packet from packet network 104 is received by packet distribution module 102.

The received packet is then associated with a flow object. In one embodiment, at block 302, packet distribution module 102 creates a hash of information from the packet header fields to generate a unique flow ID. As used herein, the term "hash" refers to an operation which takes as input one or more values and generates as output a value, called the "hash value". The purpose of a hash function is to generate a unique hash value for each unique set of inputs. For example, packet distribution module 102 may perform a hash function using header information such as source IP address and port and destination IP address and port as inputs to the hash function, since packets coming from the same source and going to the same destination are likely to be part of the same packet flow. For example, VoIP packets from Alice to Bob or from Bob to Alice are likely to be part of the same VoIP call. In alternate embodiments, other functions may be used to uniquely identify each flow.

At block 304, packet distribution module 102 compares the generated flow object ID with entries in flow object table 108 to see if the packet is part of an existing flow. If not, the process moves to block 306, and if so, the process moves to block 308. In one embodiment, the flow ID is used as the flow object ID. In such embodiments, flow object table 108 may be a hash table. The advantage of using a hash table to determine whether a packet belongs to a known flow is that in hash tables, the hash value is the table index. This means that the output of the hash function is used as the index into the table: if the record at that index is empty, the packet belongs to a new flow. If the record at that index contains information, the packet belongs to a known flow. Since the hash value is the index into the table, there is no need to perform a relatively time-consuming scan of the existing records of the table until a matching flow ID is found. Using hash tables can dramatically reduce the time required to determine whether flow object table 108 contains information about a particular flow or not. In alternative embodiments, flow object table 108 may be a database, an array, a data structure, a memory location, or other means to store such information.

At block 306, packet distribution module 102 may create a new flow object having the flow object ID generated at block 302 and create a new entry in flow object table 108 for the flow object. Packet distribution module 102 will then select and assign both a primary and secondary packet processing element 106 to the flow object at the time that the new flow object is created. Importantly, both the primary packet processing element and the secondary packet processing element are assigned at the time the new flow object is created. As a result, a secondary packet processing element is assigned to a flow before, rather than after, the failure of the primary packet processing element. This "select before fail" approach is much less time consuming that the "select after fail" behavior implemented by some conventional systems, in which a load balancing function waits until the failure of a processing element and then selects a secondary processing element based on the availability and/or current capacity of the remaining processing elements.

In one embodiment, packet distribution module 102 may choose the primary and/or secondary packet processing elements based on a load balancing algorithm. For example, packet distribution module 102 may determine how many flows have been assigned to each packet processing element 106, and assign the next flow to the packet processing element 106 having the least number of flows assigned to it. Alternatively, the load balancing algorithm may assign a flow to a packet processing element 106 based on capacity of an element, loading of an element, traffic density to the element, and so on. The primary and/or secondary packet processing elements may even be selected based on a simple round-robin algorithm.

Referring back to block 304, if the generated flow object ID already exists in flow object table 108, the signifies that the received packet is a part of a flow that has already been identified and had primary and secondary packet processing elements assigned to it. In this case, at block 308, packet distribution module 102 may read the entry within flow object table 108 for that flow object to retrieve the identities of the primary and secondary packet processing elements that have been assigned to that flow.

At block 310, the operational status of the primary processing element is determined. In the embodiment illustrated in FIG. 1, packet distribution module 102 may use status map 110 to determine the operational status of the primary packet element assigned to the flow in question. For example, if packet distribution module 102 receives a packet that packet distribution module 102 determines is associated with the flow represented by flow object F3, packet distribution module 102 determines that packet processing element E5 106E has been assigned as the primary packet processing element for this flow, and that packet processing element E6 106F has been assigned as the secondary packet processing element for this flow. Packet distribution module 102 then reads status map 110 to determine if E5 106E is operational. In the example illustrated in FIG. 1, status map 110 indicates that PPE #5 (i.e., E5 106E) has a status bit=1, which indicates that E5 106E is operational.

At block 312, the operational status of the primary packet processing element is checked. If the primary packet processing element is OK, i.e., operational, then the process moves to block 314, in which packet distribution module 102 forwards or transmits the packet to the primary packet processing element (E5 106E in this example), else the process moves to block 316, in which packet distribution module 102 forwards or transmits the packet to the secondary packet processing element (E6 106F in this example).

Status map 110 can be used by an administrator of packet processing element cluster 106 to proactively shape traffic for various reasons. For example, if one of the packet processing elements, such as packet processing element E1 106A, is scheduled for regular maintenance, traffic can be steered away from E1 106A by changing the status bit in status map 110 corresponding to E1 106A to indicate that E1 106A is not operational to process packets, e.g., setting the status bit to "0". Packet distribution module 102 will immediately begin to redirect traffic that would otherwise be normally directed to E1 106A. Using the scenario illustrated in FIG. 1, packets that are part of flow F1 would be redirected to E2 106B, and packets that are part of flow F7 would be redirected to E5 106E. New flows would not be assigned to E1 106A so long as its status bit in status map 110 is set to "0". After maintenance has been performed on E1 106A, the administrator can simply set its status bit in status map 110 to a value indicating that the packet processing element is operational, e.g., the bit may be set to "1".

In one embodiment, packet processing elements 106A~F may perform security functions on incoming packets. Example security functions include encryption and decryption of packet headers or payloads, authentication of packet source, destination, sender, or receiver, authorization of the packet, or other encryption system functions, such as signing, certification, hash or digest creation, public or private key functions, such as key exchange, and so forth. In one embodiment, packet processing elements 106 may perform other packet processing functions. The subject matter herein contemplates performing any packet processing function, and especially packet processing functions in which it is desirable to have little to no failover response time. Packet processing elements 106A~F may perform security functions or perform other processing on outgoing packets as well.

It will be understood that various details of the subject matter described herein may be changed without departing from the scope of the subject matter described herein. Furthermore, the foregoing description is for the purpose of illustration only, and not for the purpose of limitation.

What is claimed is:

1. A packet distribution system, comprising:

a processor; and a memory coupled to the processor, the memory configured to store instructions executable by the processor to cause the packet distribution system to:

maintain information about an operating status of each of a plurality of packet processing devices, the information indicating whether a corresponding one of the packet processing devices is capable or not capable of processing packets;

maintain information about packet flows being processed by the packet processing devices, and, for each packet flow, assigning one of the plurality of packet processing devices as a primary device for the packet flow and assigning another of the plurality of packet processing devices as a secondary device for the packet flow, wherein to maintain the information about the packet flows being processed by the packet processing devices, the instructions are executable by the processor to further cause the packet distribution system to:

receive a packet, determine whether the packet is associated with a new packet flow or an existing packet flow, and in response to a determination that the packet is associated with a new packet flow, assign one of the plurality of packet processing devices as a primary packet processing device for the new packet flow, and, prior to a failure of the primary packet processing device for the new packet flow, assign another of the plurality of packet processing devices as a secondary packet processing device for the new packet flow; and route packets to the packet processing devices according to the operating status of the packet processing devices that have been assigned to the packet flow with which the packets are associated.

2. The packet distribution system of claim 1, wherein to determine whether the packet is associated with the new packet flow or the existing packet flow, the instructions are executable by the processor to further cause the packet distribution system to:

generate a packet flow identifier based on information within the packet;

determine whether the generated packet flow identifier matches a packet flow identifier within an existing packet flow object;

in response to a determination that the generated packet flow identifier matches a packet flow identifier within an existing packet flow object, associate the received packet with the existing packet flow object that represents an existing packet flow; and in response to a determination that the generated packet flow identifier does not match a packet flow identifier within an existing packet flow object, associate the received packet with a new packet flow object for representing a new packet flow.

3. The packet distribution system of claim 2, wherein generating a packet flow identifier based on information within the packet includes generating a packet flow identifier based on a hash of values contained within the packet.

4. The packet distribution system of claim 1, wherein determining the operational status of the primary packet processing device assigned to the packet flow includes using heartbeat messages to or from each of the packet processing devices to monitor the operational status of the packet processing devices.

5. The packet distribution system of claim 1, wherein the instructions are executable by the processor to further cause the packet distribution system to assign the primary and secondary packet processing devices for the new packet flow according to a load balancing algorithm configured to balance the load across the plurality of packet processing devices.

6. The packet distribution system of claim 1, wherein at least one of the plurality of packet processing devices performs at least one of a security operation, a media gateway operation, or a session border control operation.

7. The packet distribution system of claim 6, wherein the security operation comprises at least one of an encryption operation, a decryption operation, a hash operation, a message digest operation, a message signing operation, a certification operation, an authentication operation, an authorization operation, or a key exchange operation.

8. The packet distribution system of claim 1, wherein the plurality of packet processing devices are configured in a fault-tolerant configuration.

9. A packet distribution system, comprising:
a processor; and
a memory coupled to the processor, the memory configured to store instructions executable by the processor to cause the packet distribution system to:
maintain information about an operating status of each of a plurality of packet processing devices, the information indicating whether a corresponding one of the packet processing devices is capable or not capable of processing packets;
maintain information about packet flows being processed by the packet processing devices, and, for each packet flow, assigning one of the plurality of packet processing devices as a primary device for the packet flow and assigning another of the plurality of packet processing devices as a secondary device for the packet flow; and
route packets to the packet processing devices according to the operating status of the packet processing devices that have been assigned to the packet flow with which the packets are associated, wherein to route the packets to the packet processing devices according to the operating status of the packet processing devices that have been assigned to the flow with which the packets are associated, the instructions are executable by the processor to further cause the packet distribution system to:
receive a packet that is associated with a packet flow, determine the operational status of the primary packet processing device assigned to the packet flow, in response to a determination that the primary packet processing device is capable of processing the packet, forward the packet to the primary packet processing device for processing, and in response to a determination that the primary packet processing device is not capable of processing the packet, forward the packet to the secondary packet processing device for processing.

10. The packet distribution system of claim 9, wherein each packet flow represents at least one of a call or call attempt in the network, a session in the network, or a media stream in the network.

11. packet distribution system, comprising:
a processor; and
a memory coupled to the processor, the memory configured to store instructions executable by the processor to cause the packet distribution system to:
maintain information about an operating status of each of a plurality of packet processing devices, the information indicating whether a corresponding one of the packet processing devices is capable or not capable of processing packets;
maintain information about packet flows being processed by the packet processing devices, and, for each packet flow, assigning one of the plurality of packet processing devices as a primary device for the packet flow and assigning another of the plurality of packet processing devices as a secondary device for the packet flow, wherein to maintain the information about the packet flows, the instructions are executable by the processor to further cause the packet distribution system to use packet flow objects, each packet flow object including:
a packet flow identifier for identifying the packet flow,
an identification of the primary packet processing device assigned to the packet flow, and
an identification of the secondary packet processing device assigned to the packet flow; and
route packets to the packet processing devices according to the operating status of the packet processing devices that have been assigned to the packet flow with which the packets are associated.

12. The packet distribution system of claim 11, wherein at least one of the plurality of packet processing devices is geographically diverse from another of the plurality of packet processing devices.

13. The packet distribution system of claim 11, wherein the plurality of packet processing devices are co-located with the packet distribution system.

14. A packet distribution system, comprising:
a processor; and
a memory coupled to the processor, the memory configured to store instructions executable by the processor to cause the packet distribution system to:
maintain information about an operating status of each of a plurality of packet processing devices, the information indicating whether a corresponding one of the packet processing devices is capable or not capable of processing packets, wherein maintaining information about the operating status of each device of the plurality of packet processing devices includes using a status map for indicating the operational status of each packet processing device;
maintain information about packet flows being processed by the packet processing devices, and, for each packet flow, assigning one of the plurality of packet processing devices as a primary device for the packet flow and assigning another of the plurality of packet processing devices as a secondary device for the packet flow; and route packets to the packet processing devices according to the operating status of the packet processing devices that have been assigned to the packet flow with which the packets are associated.

15. The packet distribution system of claim 14, wherein the status map comprises a bitmap having a bit for each of the plurality of packet processing devices, wherein a first value of a bit in the bitmap indicates that a packet processing device corresponding to that bit is presently capable of processing packets and wherein a second value of the bit in the bitmap indicates that the packet processing device corresponding to that bit is not presently capable of processing packets.

16. A method comprising:

maintaining information about an operating status of each of a plurality of packet processing devices, the information indicating whether a corresponding one of the packet processing devices is capable or not capable of processing packets;

maintaining information about packet flows being processed by the plurality of packet processing devices, and, for each packet flow, assigning one of the plurality of packet processing devices as a primary device for the packet flow and assigning another of the plurality of packet processing devices as a secondary device for the packet flow, wherein maintaining information about packet flows being processed by the packet processing devices includes:

receiving a packet, determining whether the packet is associated with a new packet flow or with an existing packet flow, and in response to a determination that the packet is associated with a new packet flow, assigning one of the plurality of packet processing devices as a primary packet processing device for the new packet flow, and, prior to a failure of the primary packet processing device for the new packet flow, assigning another of the plurality of packet processing devices as a secondary packet processing device for the new packet flow; and routing packets to the packet processing devices according to the operating status of the packet processing devices that have been assigned to the packet flow with which the packets are associated.

17. The method of claim 16, wherein determining whether the packet is associated with the new packet flow or with the existing packet flow includes:

generating a packet flow identifier based on information within the packet;

determining whether the generated packet flow identifier matches a packet flow identifier within an existing packet flow object;

in response to a determination that the generated packet flow identifier matches a packet flow identifier within an existing packet flow object, associating the received packet with the existing packet flow object that represents an existing packet flow; and in response to a determination that the generated packet flow identifier does not match a packet flow identifier within an existing packet flow object, associating the received packet with a new packet flow object for representing a new packet flow.

18. The method of claim 17, wherein generating the packet flow identifier based on information within the packet includes generating a packet flow identifier based on a hash of values within the packet.

19. The method of claim 16, wherein determining the operational status of the primary packet processing device comprises accessing a data structure configured to store operational status for each packet processing device.

20. A method comprising:

maintaining information about an operating status of each of a plurality of packet processing devices, the information indicating whether a corresponding one of the packet processing devices is capable or not capable of processing packets;

maintaining information about packet flows being processed by the plurality of packet processing devices, and, for each packet flow, assigning one of the plurality of packet processing devices as a primary device for the packet flow and assigning another of the plurality of packet processing devices as a secondary device for the packet flow; and routing packets to the packet processing devices according to the operating status of the packet processing devices that have been assigned to the packet flow with which the packets are associated, wherein routing packets to the packet processing devices according to the operating status of the packet processing devices that have been assigned to the flow with which the packets are associated includes:

receiving a packet that is associated with a packet flow, determining the operational status of the primary packet processing device assigned to the packet flow, in response to a determination that the primary packet processing device is capable of processing the packet, forwarding the packet to the primary packet processing device for processing, and in response to a determination that the primary packet processing device is not capable of processing the packet, forwarding the packet to the secondary packet processing device for processing.

21. The method of claim 20, wherein each packet flow represents at least one of: a call or call attempt in the network, a session in the network, or a media stream in the network.

22. The method of claim 20, further comprising using heartbeat messages to monitor operational status of the packet processing devices.

23. The method of claim 20, wherein assigning primary and secondary packet processing devices for the packet flow includes assigning the primary and secondary packet processing devices according to a load balancing algorithm for balancing the load across the plurality of packet processing devices.

24. The method of claim 20, comprising, at a packet processing device, receiving the forwarded packet and processing the packet according to at least one of a security operation, a media gateway operation, and a session border control operation.

25. The method of claim 24, wherein the security operation comprises at least one of: an encryption operation, a decryption operation, a hash operation, a message digest operation, a message signing operation, a certification operation, an authentication operation, an authorization operation, or a key exchange operation.

26. The method of claim 20, wherein the plurality of packet processing devices are configured in a fault-tolerant configuration.

27. A method comprising:
maintaining information about an operating status of each of a plurality of packet processing devices, the information indicating whether a corresponding one of the packet processing devices is capable or not capable of processing packets;
maintaining information about packet flows being processed by the plurality of packet processing devices, and, for each packet flow, assigning one of the plurality of packet processing devices as a primary device for the packet flow and assigning another of the plurality of packet processing devices as a secondary device for the packet flow, wherein maintaining information about packet flows being processed by the packet processing devices includes using packet flow objects for maintaining information about packet flows, and wherein each packet flow object includes:
a packet flow identifier for identifying the packet flow,
an identification of the primary packet processing device assigned to the packet flow, and
an identification of the secondary packet processing device assigned to the packet flow; and
routing packets to the packet processing devices according to the operating status of the packet processing devices that have been assigned to the packet flow with which the packets are associated.

28. The method of claim 27, wherein at least one of the plurality of packet processing devices is geographically diverse from another of the plurality of packet processing devices.

29. A method comprising:
maintaining information about an operating status of each of a plurality of packet processing devices, the information indicating whether a corresponding one of the packet processing devices is capable or not capable of processing packets;
maintaining information about packet flows being processed by the plurality of packet processing devices, and, for each packet flow, assigning one of the plurality of packet processing devices as a primary device for the packet flow and assigning another of the plurality of packet processing devices as a secondary device for the packet flow; and
routing packets to the packet processing devices according to the operating status of the packet processing devices that have been assigned to the packet flow with which the packets are associated;
wherein determining the operational status of the primary packet processing device comprises accessing a data structure configured to store operational status for each packet processing device; and
wherein the data structure configured to store operational status for each packet processing device comprises a bitmap, wherein a first value of a bit in the bitmap indicates that a packet processing device corresponding to that bit is currently capable of processing packets and wherein a second value of the bit in the bitmap indicates that the packet processing device corresponding to that bit is not currently capable of processing packets.

30. A computer readable medium having stored thereon computer-executable instructions that, upon execution by a processor of a packet distribution system, causes the packet distribution system to:
identify one of a plurality of packet flows to which a received packet belongs;
determine whether a given packet processing device corresponding to the identified packet flow is presently capable of processing the received packet based, at least in part, upon: (i) a flow table correlating each of the plurality of packet flows to a corresponding one of a plurality of packet processing devices, and (ii) a bitmap indicating whether each of the plurality of packet processing devices is presently capable or not capable to process packets; and
at least one of: (a) in response to the given packet processing device being presently capable of processing the received packet, distributing the received packet to the given packet processing device; or (b) in response to the given packet processing device not being presently capable of processing the received packet, distributing the received packet to another one of the plurality of packet devices designated as an alternate packet processing device for the identified packet flow in the flow table.

* * * * *